(12) United States Patent
Dupont et al.

(10) Patent No.: US 10,533,693 B2
(45) Date of Patent: Jan. 14, 2020

(54) PRESSURIZED CHAMBER MANAGEMENT

(71) Applicant: Schlumberger Technology Corporation, Sugar Land, TX (US)

(72) Inventors: Hugues Dupont, Katy, TX (US); Adam Zygmunt Cygan, Sugar Land, TX (US); Stephen Dennis Parks, Houston, TX (US); Christopher Del Campo, Houston, TX (US); Alien Ugalde, Sugar Land, TX (US); Christopher Irvine, Houston, TX (US); Thomas Murray, Asker (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 92 days.

(21) Appl. No.: 15/646,123

(22) Filed: Jul. 11, 2017

(65) Prior Publication Data

US 2018/0017201 A1    Jan. 18, 2018

Related U.S. Application Data (60) Provisional application No. 62/362,877, filed on Jul. 15, 2016.

(51) Int. Cl.
| | |
|---|---|
| *F16L 55/053* | (2006.01) |
| *F15B 1/04* | (2006.01) |
| *E21B 41/00* | (2006.01) |
| *E21B 49/10* | (2006.01) |
| *E21B 49/08* | (2006.01) |
| *E21B 47/12* | (2012.01) |

(52) U.S. Cl.
CPC ............ *F16L 55/053* (2013.01); *E21B 41/00* (2013.01); *E21B 49/10* (2013.01); *F15B 1/04* (2013.01); *E21B 47/12* (2013.01); *E21B 2049/085* (2013.01); *F15B 2201/31* (2013.01)

(58) Field of Classification Search
CPC ... F16L 55/053; F16L 55/045; F15B 2201/00; F15B 2201/31; F15B 2201/205
USPC ................. 138/31, 30; 166/364; 251/1.1–1.3
See application file for complete search history.

(56) References Cited

U.S. PATENT DOCUMENTS

| | | | | |
|---|---|---|---|---|
| 1,663,647 | A * | 3/1928 | Alanson ................. | F15B 1/027 137/565.19 |
| 3,672,402 | A * | 6/1972 | Bloemer .................. | F15B 1/02 138/31 |
| 4,388,052 | A * | 6/1983 | Falendysz, Sr. ........ | F04B 49/16 138/30 |

(Continued)

FOREIGN PATENT DOCUMENTS

EP        0534590        3/1993

*Primary Examiner* — Patrick F Brinson
(74) *Attorney, Agent, or Firm* — Trevor G. Grove (57) ABSTRACT

Apparatus and methods for filling a pressure compensated fluid container with a liquid. An example method includes restraining movement of a piston slidably disposed within the fluid container in a first piston position, wherein the piston divides the fluid container into first and second portions. The method further includes pumping the liquid into the first portion to compress gas located within the first portion, stopping the pumping of the liquid into the first portion, and stopping the restraining of movement of the piston to permit the piston to move to a second piston position due to expansion of the gas compressed within the first portion.

20 Claims, 4 Drawing Sheets

(56) References Cited

U.S. PATENT DOCUMENTS

| | | | |
|---|---|---|---|
| 4,928,376 A | 5/1990 | Poglitsch | |
| 5,142,407 A | 8/1992 | Varaprasad et al. | |
| 5,151,816 A | 9/1992 | Varaprasad et al. | |
| 5,268,049 A | 12/1993 | Marriott et al. | |
| 5,856,211 A | 1/1999 | Tonazzi et al. | |
| 6,267,147 B1 * | 7/2001 | Rago | F01D 25/20 138/26 |
| 6,858,466 B1 | 2/2005 | Bower et al. | |
| 7,051,773 B2 | 5/2006 | Watanabe et al. | |
| 7,308,913 B2 | 12/2007 | Watanabe et al. | |
| 8,316,891 B2 * | 11/2012 | Koyama | B60T 8/368 138/31 |
| 2006/0260919 A1 | 11/2006 | Aimi et al. | |
| 2009/0293977 A1 * | 12/2009 | Lauterbach | F15B 1/04 138/31 |
| 2014/0290972 A1 * | 10/2014 | Robson | E02D 7/10 173/1 |

* cited by examiner

PRESSURIZED CHAMBER MANAGEMENT

CROSS-REFERENCE TO RELATED APPLICATIONS

This application is based on and claims the benefit of and priority to U.S. Provisional Application No. 62/362,877, entitled "Pressurized Chamber Management", filed on Jul. 15, 2016, the entire disclosures of which are hereby incorporated herein by reference.

BACKGROUND OF THE DISCLOSURE

Wells are generally drilled into a land surface or ocean bed to recover natural deposits of oil and gas, as well as other natural resources that are trapped in geological formations in the Earth's crust. Wellbores may be drilled along a trajectory to reach one or more subterranean rock formations containing the hydrocarbons and other downhole fluids. Formation evaluation and other downhole tools and operations have become increasingly complex and expensive as wellbores are drilled deeper and through more difficult materials. Such wellbores present increasingly harsher environments, where temperature may exceed 250 degrees Celsius and pressure may exceed 30,000 pounds per square inch (PSI).

In working with deeper and more complex wellbores, it becomes more likely that downhole tools, tool strings, and/or other downhole apparatuses may include numerous testing, navigation, and/or communication tools. Extreme downhole conditions may subject such tools to a variety of loads, including but not limited to pressure differential, tension, compression, hydraulic force, shock, and vibrations. Such loads can damage the tools, cause downhole fluids to leak into the tools, and/or otherwise compromise the accuracy and even operation of the tools.

To minimize effects of the extreme downhole conditions, various empty cavities or chambers within downhole tools may be pressure compensated and, thus, filled with a fluid operable to maintain internal portions of the downhole tools at a pressure substantially equal to the wellbore pressure. Gas, such as air, trapped within the downhole tools may prevent or reduce the benefits of pressure compensation and/or cause damage or unintended operation of the downhole tools while being subjected to the high pressure and/or high temperature wellbore environments. Accordingly, gas is typically purged or extracted from the various cavities and chambers of the downhole tools prior to or during fluid filling operations. However, fluid filling operations, such as gravity filling, vacuum filling, and gas flushing are typically unable to completely purge or extract gas from the cavities and chambers, especially cavities and chambers having arbitrary and/or complex geometries, which may act to trap gas therein. Such filling operations often leave a variable and not easily determined amount of residual gas within the cavities and chambers. To overcome the unintended effects of residual gas, the downhole tools may be increased in length and thickness. However, in downhole oil and gas operations, where space is valuable, an increase in size and weight has the effect of decreasing operational efficiency and increasing cost.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus having a pressure compensated fluid containment system that includes a chamber and a piston slidably disposed within the chamber. The piston divides the chamber into first and second portions. The first portion is fluidly connected with a port of the chamber, and the second portion is in fluid communication with a space external to the apparatus. During liquid filling operations, the apparatus is operable to maintain the piston in a first piston position within the chamber while the first portion receives a liquid via the port to compress gas located within the first portion, and the apparatus is also operable to permit the piston to move to a second piston position due to expansion of the gas compressed within the first portion.

The present disclosure also introduces a method that includes restraining movement of a piston slidably disposed within a pressure compensated fluid container in a first piston position. The piston divides the fluid container into first and second portions. The method also includes pumping a liquid into the first portion to compress gas located within the first portion, stopping the pumping of the liquid into the first portion, and stopping the restraining of movement of the piston to permit the piston to move to a second piston position due to expansion of the gas compressed within the first portion.

The present disclosure also introduces a method that includes filling a pressure compensated fluid chamber of a downhole tool by: (1) restraining movement of a piston slidably disposed within the chamber in a first piston position, the piston dividing the chamber into first and second portions, and the second portion being in fluid communication with a space external to the downhole tool; (2) pumping a liquid into the first portion to compress gas located within the first portion; (3) stopping the pumping of the liquid into the first portion; and (4) stopping the restraining of movement of the piston to permit the piston to move to a second piston position due to expansion of the gas compressed within the first portion. The method may also include conveying the downhole tool within a wellbore causing an increasing ambient pressure to move the piston away from the second piston position as the liquid and gas within the first portion is compressed to maintain pressure within the first portion substantially equal to the increasing ambient pressure.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Example implementations of an apparatus described herein relate generally to a pressure and temperature compensated fluid container and chamber utilized in high pressure and temperature environments. Example implementations of a method described herein relate generally to liquid filling operations of the compensated chamber for use in applications where minimal residual air or another gas volume is intended under operating conditions.

Figure 1:
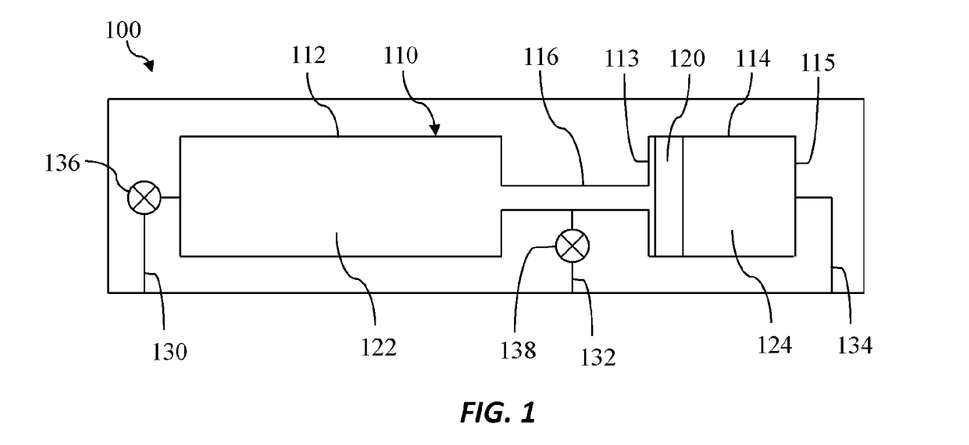
FIG. 1 is a schematic view of at least a portion of an example implementation of apparatus according to one or more aspects of the present disclosure.

FIG. 1 is a schematic view of at least a portion of an example implementation of a fluid vessel or containment system 100 (referred to hereinafter as a "container") comprising a pressure and temperature compensated fluid containing space or chamber 110 (referred to hereinafter as a "chamber") according to one or more aspects of the present disclosure.

The chamber 110 may comprise one or more open spaces or cavities 112, 114 fluidly connected via a fluid pathway or conduit 116 collectively operable to contain fluids, including gasses and liquids. The chamber 110 may contain a piston 120 slidably disposed therein and dividing the chamber 110 into first and second volumes or portions 122, 124. The piston 120 may be disposed within the cavity 114 and movable between opposing ends 113, 115 of the cavity 114. The chamber 110 may further comprise a plurality of ports extending between the chamber 110 and a space external to the container 100. For example, the container 100 may comprise a first port 130 fluidly connected with the first portion 122 and a second port 132 fluidly connected with the first portion 122 at a distance from the first port 130. The container 100 may further comprise a pressure compensation port 134 fluidly connected with the second portion 124. Fluid communication through the ports 130, 132 may be controlled by fluid valves 136, 138 operable to selectively permit and prevent fluid communication into and out of the first portion 122 during liquid filling and actual field operations. The fluid valves 136, 138 may be or comprise ball valves, globe valves, butterfly valves, and/or other types of fluid valves, such as may be selectively opened and closed to permit and prevent fluid flow. Each fluid valve 136, 138 may be actuated remotely by a corresponding actuator (not shown), such as a solenoid, motor, or other electric actuator, or a fluid actuator, such as a pneumatic or hydraulic cylinder or rotary actuator. Each of the fluid valves 136, 138 may also be actuated manually, such as by a lever (not shown).

Figure 2:
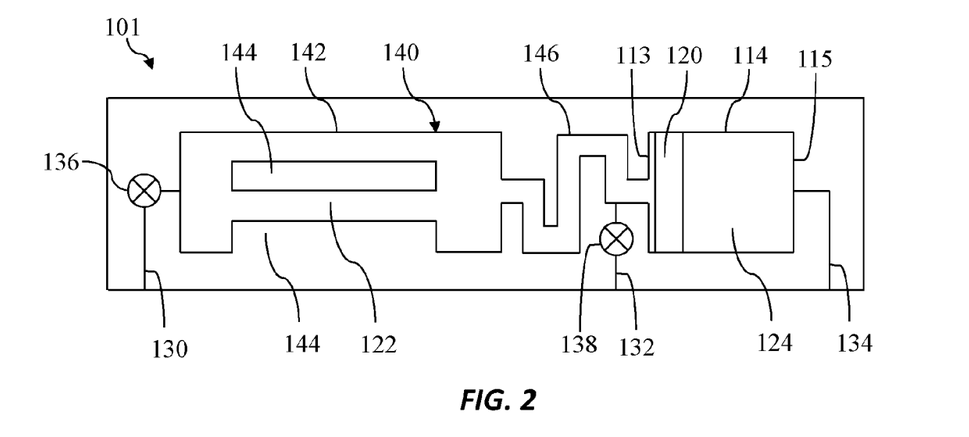
FIG. 2 is a schematic view of at least a portion of an example implementation of apparatus according to one or more aspects of the present disclosure.

Although the chamber 110 is shown comprising two cavities 112, 114 fluidly connected by a single conduit 116, a chamber within the scope of the present disclosure may comprise a different number of cavities fluidly connected by multiple conduits. Furthermore, the cavities and conduits within the scope of the present disclosure may be irregularly-shaped. FIG. 2 is a schematic view of at least a portion of another example implementation of a container 101 according to one or more aspects of the present disclosure. The container 101 comprises one or more similar features of the container 100 shown in FIG. 1, including where indicated by like reference numbers, except as described below.

The container 101 may include an irregularly-shaped chamber 140 comprising a cavity 114 and an irregularly-shaped cavity 142 fluidly connected via an irregularly-shaped conduit 146. An irregularly-shaped cavity or conduit may comprise, for example, irregularly-shaped or uneven surfaces, and/or arbitrary or complex geometries, such as comprising recesses, crevices, protrusions, bends, curves, and/or other irregular features. An irregularly-shaped cavity or conduit may also be, for example, a cavity or conduit containing or housing therein various mechanical and/or electronic components 144. Similarly to the chamber 110, the chamber 140 may contain a piston 120 dividing the chamber 140 into first and second portions 122, 124 and movable between opposing ends 113, 115 of the cavity 114. The chamber 140 may further comprise a plurality of ports 130, 132, 134 extending between the chamber 140 and a space external to the container 101. Fluid communication through the ports 130, 132 may be controlled by fluid valves 136, 138 operable to selectively permit and prevent fluid communication into and out of the first portion 122 during the liquid filling operations and actual field operations.

Figure 3:
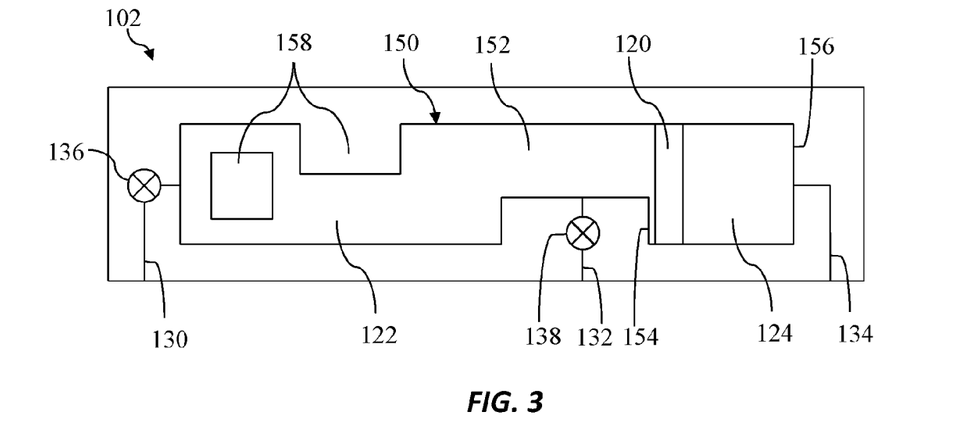
FIG. 3 is a schematic view of at least a portion of an example implementation of apparatus according to one or more aspects of the present disclosure.

Although the chambers 110, 140 are each shown comprising multiple cavities fluidly connected by a conduit, a chamber within the scope of the present disclosure may be or comprise a single cavity, which may be irregularly-shaped. FIG. 3 is a schematic view of at least a portion of another example implementation of a container 102 according to one or more aspects of the present disclosure. The container 101 comprises one or more similar features of the container 100 shown in FIG. 1, including where indicated by like reference numbers, except as described below.

The container 102 may include an irregularly-shaped chamber 150, which may be or comprise a single irregularly-shaped cavity 152 or contain therein mechanical and/or electronic components 158. The chamber 150 may contain a piston 120 slidably disposed therein and dividing the chamber 150 into first and second portions 122, 124. The piston 120 may be movable between two features of the cavity 152, such as a protrusion or shoulder 154 extending into the cavity 152 and a terminal end 156 of the cavity 152. The chamber 150 may further comprise a plurality of ports 130, 132, 134 extending between the chamber 150 and a space external to the container 102. Fluid communication through the ports 130, 132 may be controlled by fluid valves 136, 138 operable to selectively permit and prevent fluid communication into and out of the first portion 122 during the liquid filling operations and actual field operations.

One or more of the containers 100, 101, 102 may be incorporated as part of an apparatus or tool for use in high pressure and/or high temperature environments to maintain a liquid contained within the chamber 110, 140, 150 at a pressure that is substantially equal to the external environment within which the container 100, 101, 102 is utilized. Maintaining internal and external pressures substantially equal during field operations may minimize housing or wall thickness, size, and mass of the container 100, 101, 102 and/or the apparatus utilizing the container 100, 101, 102. As the container 100, 101, 102 may be utilized as part of various apparatuses and tools and in different environments, the liquid utilized to fill the first portion 122 during the filling operations may be determined based on the actual application of the container 100, 101, 102. Factors for selecting the liquid may include environmental factors, such as the temperature and pressure ranges of the external environment and type of fluid the container 100, 101, 102 is disposed in during the field operations. Other factors may include coefficients of compression and expansion of the liquid, chemical compatibility of the liquid with the container 100, 101, 102 and/or with the components disposed within the chamber 110, 140, 150, electrical conductivity, and viscosity, among other examples. Example liquids may include water, such as distilled water, oil, such a lubricating oil, hydraulic fluid, and gel, such as filling gel, among other examples.

In an example implementation, the container 100, 101, 102 may be a portion of a mechanical device wherein the chamber 110 may be operable to contain therein or house various mechanical components 144, 158 of the mechanical device and a lubricant for lubricating and/or dissipating heat from the mechanical components 144, 158. The container 100, 101, 102 may be operable to compensate for the changing volume of the lubricant and maintain the lubricant at a pressure substantially equal to the pressure of the external environment, independent of the temperature of the external environment. The chamber 110, 140, 150 may comprise various irregular features associated with the mechanical components 144, 158, such as gears, cams, and pistons, which may be lubricated by the lubricant while the chamber 110, 140, 150 is maintained at a pressure that is substantially equal to the pressure of the external environment, such as to prevent damage to the mechanical components 144, 158 due to high pressure differentials. For example, the container 100, 101, 102 may be a portion of a viscous fluid power transmission, whereby various transmission gears may be at least partially located within the first portion 122 of the chamber 110, 140, 150. The container 100, 101, 102 may also be or comprise a portion of a motor cavity, wherein the first portion 122 of the chamber 110, 140, 150 may contain therein a motor submerged within a lubricant operable to lubricate and/or dissipate heat from the motor while maintaining the chamber 110, 140, 150 at a pressure substantially equal to the pressure of the external environment, independent of the temperature of the external environment.

In another example implementation, the container 100, 101, 102 may house electronic components 144, 158 within the chamber 110, 140, 150, such circuit boards, sensors, or other electronic components. Accordingly, the chamber 110, 140, 150 may comprise various irregular features associated with the electronic components 144, 158. The chamber 110, 140, 150 may be filled with distilled water, oil, gel, or a filling fluid, which may be maintained at a pressure substantially equal to the pressure of the external environment, independent of the temperature of the external environment, such as to prevent damage to the electronic components due to high pressure differentials.

Furthermore, although the liquid within the chamber 110, 140, 150 may expand due to increasing temperature of the external environment, temperature of the liquid may also or instead be increased by the mechanical and/or electronic components 144, 158 located within the chamber 110, 140, 150. Accordingly, the container 100, 101, 102 may be operable to compensate for fluid expansion caused by internally generated heat.

Figure 4:
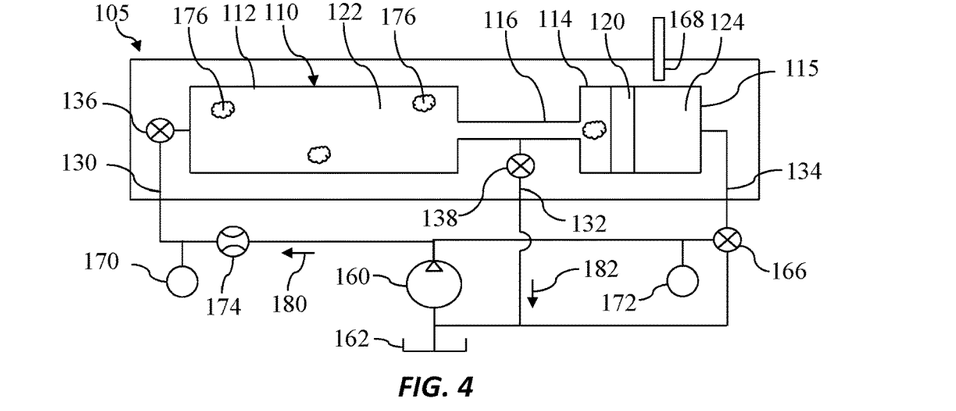
FIG. 4 is a schematic view of the apparatus shown in FIGS. 1-3 according to one or more aspects of the present disclosure.
Figure 5:
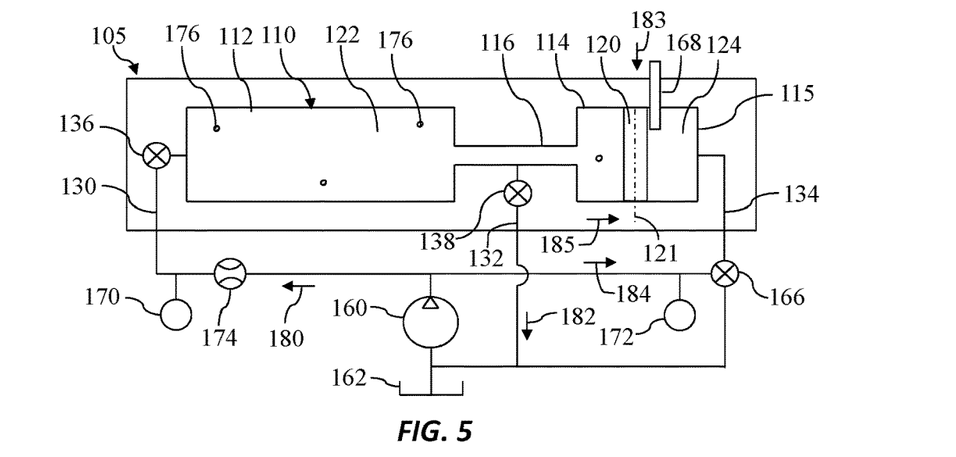
FIG. 5 is another view of the apparatus shown in FIG. 4 in a different stage of operation.
Figure 6:
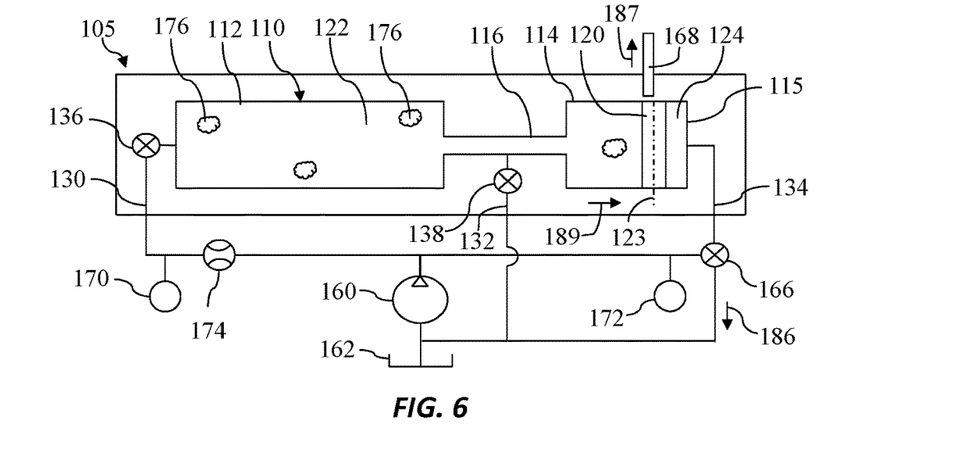
FIG. 6 is another view of the apparatus shown in FIGS. 4 and 5 in a different stage of operation.

FIGS. 4-6 are sectional views of an example implementation of a container 105 and liquid filling equipment during different stages of the liquid filling or priming operations (referred to hereinafter as "filling operations") according to one or more aspects of the present disclosure. Although the container 105 resembles the container 100 shown in FIG. 1, it is to be understood that the filling operations may be utilized to fill the chambers 110, 140, 150 of the respective containers 100, 101, 102 shown in FIGS. 1-3. It is to be further understood that the container 105 represents the containers 100, 101, 102 and may be substantially similar to and/or otherwise have one or more aspects in common with the containers 100, 101, 102, including, but not limited to, where indicated by like reference numbers.

The piston 120 slidably disposed within the cavity 114 may be operable to compensate or maintain the pressure within the first portion 122 of the chamber 110 substantially equal to the pressure external to the container 105 as the liquid within the first portion 122 increases and/or decreases in volume (i.e., expands and/or compresses) when the temperature and/or pressure external to the container fluctuates during the actual field operations. If the volume of the cavity 114 is not sufficient to fully compensate for the expansion and compression of the liquid within the first portion 122 or if the piston 120 is positioned in a less than optimal position within the cavity 114, the piston 120 may contact one or both of the opposing ends 113, 115 of the cavity 114 during the field operations and limit compensation. For example, if the piston 120 contacts the end 113 of the cavity 114 during the field operations, additional compensation for the decrease in volume of the liquid within the first portion 122 may not be permitted, resulting in the pressure within the first portion 122 remaining substantially constant as the external pressure increases. If the piston 120 contacts the end 115 of the cavity 114 during the field operations, additional compensation for the increase in volume of the liquid within the first portion 122 may not be permitted, resulting in a pressure increase within the first portion 122 with respect to the external pressure as the external temperature increases.

As gas, such as air, is highly compressible, the gas located within the first portion 122 may be compressed and cause the piston 120 to contact the end 113 of the cavity 114 at a pressure lower than the pressure external to the container 105. Accordingly, the pressure within the first portion 122 may not be compensated or maintained equal to the external pressure until, for example, the liquid within the first portion expands sufficiently to increase the pressure within the first portion 122 until it is substantially equal to or slightly greater than the external pressure to move the piston away from the end 113 of the cavity 114 toward the end 115 of the cavity 114. The gas located within the first portion 122 during the field operations may result in piston motion during which no pressure compensation is achieved, which may be referred to hereinafter as "lost stroke." To overcome the effects of the lost stroke and permit pressure compensation throughout the entire field operations, the compensation volume may be increased to permit compression of the gas within the first portion 122 until it equals the external pressure. However, increasing the compensation volume of the cavity 114 may not be an optimal solution, as such an increase may result in a corresponding increase in piston stroke length and, thus, size and weight of the container 105. The filling operations within the scope of the present disclosure may permit more liquid to be introduced into the first portion 122 than with known fluid filling and/or gas extracting operations, reduce the amount of the gas remaining in the first portion 122 of the chamber 110, and/or reduce the unintended effects of the gas remaining in the chamber 110 during the field operations.

The liquid filling equipment may include a pump 160 fluidly connected with and operable to receive a liquid from a liquid tank 162. An outlet of the pump 160 may be fluidly connected with the port 130, such as may permit the pump 160 to pump the liquid from the tank 162 into the first portion 122 of the chamber 110. The outlet of the pump 160 may also be optionally fluidly connected with the port 134, such as may permit the pump 160 to increase the pressure within the second portion 124 of the chamber 110 during the filling operations. The liquid filling equipment may further comprise a three-way fluid valve 166 selectively operable to fluidly connect the outlet of the pump 160 with the port 134 or to fluidly connect the port 134 with the tank 162 while fluidly isolating the outlet of the pump 160.

The liquid filling equipment or the container 105 may be operable to lock or otherwise maintain the piston 120 in a predetermined position within the cavity 114 during the filling operations. For example, the piston 120 may be mechanically maintained in the predetermined position, such as with a latching mechanism comprising a pin or latch 168 operable to selectively extend into the cavity 114 to engage with the piston 120 to prevent the piston 120 from moving or otherwise to maintain the piston 120 in the predetermined position within the cavity 114. The latch 168 may be further operable to selectively retract to disengage from the piston 120 and permit the piston 120 to move within the cavity 114.

The liquid filling equipment may also comprise one or more pressure sensors 170, 172 operable to generate signals or information indicative of the pressure of the liquid pumped into the first and/or second portions 122, 124 of the chamber 110 by the pump 160, such as may permit monitoring of the liquid pressure within the first and/or second portions 122, 124 during the filling operations. The liquid filling equipment may also comprise a flow rate sensor 174, such as a flow meter, operable to generate signals or information indicative of the volumetric and/or mass flow rate of the liquid pumped into the first portion 122 by the pump 160, such as may permit monitoring or measuring of the flow rate and/or volume of the liquid being introduced into the first portion 122.

As shown in FIG. 4, the filling operations may include gas extraction operations, such as gas flushing operations. Prior to initiating the flushing operations, the fluid valves 136, 138 may be shifted to open-flow positions to fluidly connect the first portion with the pump 160 and the liquid tank 162. The fluid valve 166 may be shifted to a closed-flow position to fluidly isolate the outlet of the pump 160 from the tank 162 and the second portion 124. Thereafter, the pump 160 may be operated to circulate the liquid from the tank 162 through the first portion 122 to flush out residual air or another gas 176 trapped within the first portion 122. The liquid may be introduced into the first portion 122 via the port 130, as indicated by arrow 180, and discharged back into the tank 162 via the port 132, as indicated by arrow 182. Alternatively, the liquid filling equipment, including the pump 160 and tank 162, may be fluidly connected with the container 105 such that the liquid is introduced into the first portion 122 via the port 132 and discharged into the tank 162 via the port 130. Although not shown, other gas extraction operations, such as gravity filling and/or vacuum filling, may be utilized instead of or in addition to the flushing operations to extract the residual gas 176 from the first portion 122 of the chamber 110.

As shown in FIG. 5, the filling operations may further include pressurizing operations, which may be conducted after the gas extraction operations. Prior to initiating the pressurizing operations, the fluid valve 136 may be shifted to the open-flow position, the fluid valve 138 may be shifted to the closed-flow position, and the fluid valve 166 may be shifted to the closed-flow position. The latch 168 may be extended into the cavity 114 at a predetermined position along the cavity 114, as indicated by arrow 183. Thereafter, the pump 160 may be operated to pump the liquid from the liquid tank 162 into the first portion 122 of the chamber 110, as indicated by arrow 180, pushing the piston 120 against the latch 168, as indicated by arrow 185, which may lock or maintain the piston 120 in a predetermined piston position 121 as the pressure within the first portion 122 increases. The pump 160 may continue pumping the liquid into the first portion 122 until a predetermined pressure within the first portion 122 is achieved or until a predetermined volume of the liquid is introduced into the first portion 122. The pressure and volume of the liquid being introduced into the first portion 122 may be monitored via the pressure and flow sensors 170, 174 described above. As the pressure within the first portion 122 increases, the residual gas 176 remaining within the first portion 122 is compressed and, thus, reduced in volume to permit additional liquid to be pumped into the first portion 122.

Instead of or in addition to utilizing the latch 168 to set and maintain the piston 120 in the predetermined position 121, the piston 120 may be set and maintained in the predetermined position 121 by controlling the pressure of the liquid on both opposing sides of the piston 120. For example, the liquid may be pumped into and discharged out of the first and second portions 122, 124 until the piston 120 is located in the predetermined position 121. To permit flow into the first and second portions 122, 124, the fluid valve 136 may be shifted to the open-flow position, the fluid valve 138 may be shifted to the closed-flow position, and the fluid valve 166 may be shifted to the open-flow position to fluidly connect the outlet of the pump 160 and the second portion 124. When the piston 120 is positioned at the predetermined position 121 within the cavity 114, the pump 160 may introduce the liquid into both the first and second portions 122, 124 via the corresponding ports 130, 134, as shown by arrows 180, 184. Substantially equal pressures within the first and second portions 122, 124 may be maintained such that forces acting on the opposing sides of the piston 120 equalize to maintain the piston at the predetermined position 121 during the pressurizing operations. If the piston 120 generates friction against an inner surface of the cavity 114, the pressure differential between the first and second portions 122, 124 may be lower than such pressure differential to maintain the piston 120 in the predetermined position 121.

Although FIGS. 4 and 5 show the pump 160 and the liquid tank 162 being fluidly connected and operable to pressurize the second portion 124, it is to be understood that the second portion 124 may be pressurized by another fluid source (not shown) to maintain the piston 120 in the predetermined position 121 during the filling operations described above. Accordingly, the pump 160 and the tank 162 may be fluidly connected just with the first portion 122 of the chamber 110 to introduce the liquid into and pressurize the first portion 122.

As shown in FIG. 6, the filling operations may further include depressurizing operations, which may be conducted after the pressurizing operations. Once the pressure within the first portion 122 reaches the predetermined pressure or once a predetermined volume of the liquid is introduced into the first portion 122, the fluid valve 136 may be shifted to the closed-flow position and the fluid valve 138 may remain in the closed-flow position to prevent the liquid and the residual gas 176 from escaping from the first portion 122. The pump 160 may be turned off and the piston 120 may be permitted to move to an equilibrium position 123, as indicated by arrow 189, via the expansion of the residual gas 176 compressed within the first portion 122 until the pressures within the first and second portions equalize. If the latching mechanism was used to maintain the piston 120 in the predetermined position 121, the latch 169 may be retracted from the cavity 114, as indicated by arrow 187, to permit the compressed residual gas 176 within the first portion 122 to expand and move the piston 120 to the equilibrium position 123. If pressure equalization was used to maintain the piston 120 in the predetermined position 121, the fluid valve 166 may be shifted to the open-flow position to permit the liquid within the second portion 124 to discharge into the liquid tank 162, as shown by arrow 186, to permit the compressed residual gas 176 within the first portion 122 to expand and move the piston 120 to the equilibrium position 123. Accordingly, the equilibrium position 123 of the piston 120 may be an initial position of the piston 120 when the actual field operations are performed. For example, if before the pressurizing operations the first portion 122 contained a substantial amount of residual gas 176, the piston 120 may move to its end of stroke position into contact with the end 115 as the residual gas 176 expands. However, during the field operations when the external and internal pressure increases, the piston 120 may move away from the equilibrium position 123 toward the predetermined position 121 to permit full compensation of the chamber 110 when the temperature and pressure increase during the field operations.

Once the piston 120 moves to the equilibrium position 123, the latch 168 may be removed from the container 105 and replaced with a fluid plug (not shown) to prevent the liquid from escaping from the first portion 122 during the field operations. Furthermore, the remaining filling equipment may be disconnected from ports 130, 132, 134 and the ports 130, 132 may be fluidly isolated from the space external to the container 105 via fluid plugs (not shown) to further prevent the liquid and the residual gas 176 from escaping from the first portion 122 during the field operations.

The following description discloses additional information related to the filling operations, including methods or processes for selecting the pressure at which the liquid is pumped into the first portion 122, selecting the volume of the cavity 114, and selecting the predetermined position 121 of the piston 120, and refers to FIGS. 4-6, collectively. The liquid pumped into the first portion 122 may be pressurized to a predetermined pressure to compress the residual gas 176 within the first portion 122 to permit the first portion 122 of the chamber 110 to be substantially filled with the liquid and, thus, minimize the unintended effects of the residual gas 176 located within the first portion 122 during the field operations. The degree to which the first portion 122 may be filled with the liquid may affect the degree to which the container 105 can compensate for the expansion and compression of the liquid within the first portion 122. When fully compensated, the container 105 may minimize pressure differential between internal and external areas of the container 105 to reduce stresses on the seals, increasing time of operation and/or reducing frequency of maintenance cycles.

Because of the high compressibility of gas, actual field operating pressures do not have to be recreated to permit substantially filling of the first portion 122 with the liquid. The residual gas 176 trapped within the first portion 122 of the chamber 110 may be compressed to an intended degree to permit the first portion 122 to be sufficiently and/or substantially filled with the liquid while utilizing a predetermined pressure that is substantially lower than an expected field operating pressure. For example, assuming that the residual gas 176 located within the first portion 122 is at an ambient pressure of about 15 PSI, pressurizing the liquid to about 150 PSI may compress the residual gas 176 within the first portion 122 by a factor of ten. Accordingly, assuming that the gas extraction operations were not performed and the residual gas 176 fills the entire or most of the first portion 122 prior to the pressurizing operations, at least 90% of the first portion 122 may be filled with the liquid, while about 10% of the first portion 122 may contain the compressed residual gas 176. Under such conditions, for example, if the volume of the first portion 122 (i.e., combined volumes of the cavities 112, 114 and the conduit 116) is 100 cubic centimeters (CC), 10% of the volume of the first portion 122 or 10 CC will be lost while the remaining volume of the cavity 114, which may be known in the art as a "compensation cavity," will be utilized to compensate for the changing volume of the liquid, resulting in movement of the piston 120. If the remaining portion of the volume of the cavity 114, which may be known in the art as a "compensation volume," is sufficient to compensate for the expected expansion and compression of the liquid within the first portion 122, than the 150 PSI pressure achieved during the pressurizing operations may be sufficient. If additional compensation volume is needed, the filling operations may be performed at a higher pressure to introduce more liquid and, thus, further reduce the volume of the residual gas 176 within the first portion 122 such that a greater portion of the compensation volume may be utilized for compensation.

For example, increasing the pressure to about 750 PSI may compress the residual gas 176 within the first portion 122 by a factor of 50 such that at least 98% of the first portion 122 may be filled with the liquid, while about 2% of the first portion 122 may contain the compressed residual gas 176. Under such conditions 2% of the volume of the first portion 122 or 2 CC of the compensation volume will be lost while the remaining volume of the cavity 114 will be utilized for compensation. If such compensation volume is sufficient to compensate for expected expansion and compression of the liquid within the first portion 122, than the 750 PSI pressure achieved during the pressurizing operations may be sufficient. If additional compensation volume is needed, the pressurizing operations may be performed at even higher pressures to introduce more liquid into the first portion 122 and, thus, further minimize the volume of the residual gas 176 within the first portion 122 such that a greater portion of the compensation volume may be utilized for compensation.

Because the residual gas 176 within the first portion 122 is highly compressible, the first portion 122 may be substantially and/or sufficiently filled with the liquid by pumping the liquid into the first portion 122 at pressures ranging between about 100 PSI and about 1,500 PSI, without having to duplicate the actual field operating pressures, which may range, for example, between about 2,000 PSI and about 15,000 PSI or more. The maximum pressure at which the liquid is pumped into the first portion 122 may also be controlled by the ability of the container 105 to structurally support the internal pressures generated during the pressurizing operations. If the chamber 110 is being filled at atmospheric external pressures, pressurizing the chamber 110 may create unsafe pressure differentials and, thus, limit the maximum predetermined pressure at which the liquid may be filled. Accordingly, if the container 105 cannot be safely filled at the intended filling pressure or if a lower filling pressure is intended, the filling operations may be preceded with the gas extraction operations or other gas purging operations known in the art, which may substantially decrease the amount of residual gas 176 within the first portion 122 prior to the pressurizing portion of the filling operations. The gas extraction operations may be utilized if, for example, the pump 160 cannot generate high pressures or the container 105 cannot safely withstand hold internal pressures.

However, regardless of the pressure utilized to fill the first portion 122 with the liquid during the pressurizing operations, the container 105 may not be operable to fully compensate for the changing liquid volume during the field operations if the compensation volume (i.e., volume of the cavity 114 less the volume of the piston 120) is not sufficiently sized to permit full piston travel as the volume of the liquid within the first portion 122 changes or if the piston 120 is positioned in a less than optimal position within the cavity 114, resulting in the piston 120 contacting one or both of the opposing ends 113, 115 of the cavity 114 during the field operations. For example, if the piston 120 contacts the end 113 of the cavity 114 during the field operations, additional compensation for the decrease in volume of the liquid within the first portion 122 may not be permitted, resulting in the pressure within the first portion 122 remaining substantially constant as the external pressure increases. If the pressure differential becomes too high, external fluid may leak into the first portion 122 or cause the walls of the container 105 to bend inwardly. If the piston 120 contacts the end 115 of the cavity 114 during the field operations, additional compensation for the increasing liquid volume within the first portion 122 may not be permitted, resulting in a pressure increase within the first portion 122 with respect to the external pressure as the external temperature increases. If the pressure differential becomes too high, the liquid within the first portion 122 may leak out of the first portion 122 or cause the walls of the container 105 to bend outwardly.

The compensation volume sufficient to permit full temperature and pressure compensation of the liquid within the first portion 122 under the worst-case expansion and compression conditions, referred to hereinafter as an "ideal compensation volume," may be determined based on various factors, including the volume of the first portion 122 and the coefficients of expansion and compression. For example, the ideal compensation volume may be determined utilizing Equation (1) set forth below.

$$v_{ideal} = V\left[\frac{\beta(1+\gamma)}{1-\beta} + \gamma\right] \tag{1}$$

where $v_{ideal}$ is the ideal compensation volume of the cavity 114 less the volume of the piston 120, V is the volume of the cavity 112 and the conduit 116, referred to hereinafter as a "liquid containment volume," $\gamma$ is the coefficient of thermal expansion of the liquid, and $\beta$ is the coefficient of compression of the liquid. However, parameters and/or equations other than as expressed in Equation (1) may also be utilized to determine $v_{ideal}$ within the scope of the present disclosure.

Applying Equation (1) to an example container 105 having the liquid containment volume of 100 CC, the coefficient of expansion of 0.15, and the coefficient of compression of 0.10, the ideal compensation volume is 27.77 CC. Accordingly, for a container 105 having the liquid containment volume of 100 CC and a liquid having the coefficients of expansion and compression of 0.15 and 0.10, respectively, worst-case environmental conditions will utilize the ideal compensation volume to be about 27.77 CC.

To permit compensation throughout the entire field operations, positioning of the piston 120 during the pressurizing operations may also be determined. As described above, if the piston 120 contacts the end 113 of the cavity 114 during the field operations, additional compensation for the decrease in volume of the liquid within the first portion 122 may not be permitted and if the piston 120 contacts the end 115 of the cavity 114 during the field operations, additional compensation for the increase in volume of the liquid within the first portion 122 may not be permitted. Accordingly, the predetermined position 121 of the piston 120 may be determined based on the pressure and temperature profile during the field operations and the coefficients of expansion and compression of the liquid utilized to fill the first portion 112. The piston 120 may be positioned within the cavity 114 such that the sufficient compensation volume is provided on both sides of the piston 120 to permit both volumetric increase and decrease during the field operations. For example, the ideal compensation volume due to compression of the liquid may be determined based on the liquid containment volume V and the liquid compression coefficient $\beta$, such as by utilizing Equation (2) set forth below.

$$v_{idealcomp} = V\left[\frac{\beta}{1-\beta}\right] \tag{2}$$

where $v_{idealcomp}$ is the ideal compression compensation volume sufficient to compensate for the worst-case compression of the liquid. However, parameters and/or equations other than as expressed in Equation (2) may also be utilized to determine $v_{idealcomp}$ within the scope of the present disclosure.

Applying Equation (2) to the example container 105 described above having the liquid containment volume of 100 CC and the coefficient of compression of 0.10, the ideal compression compensation volume is about 11.11 CC. Accordingly, the predetermined position of the piston 120 may be such that at least 11.11 CC of volume is maintained on the compression side of the piston 120 (i.e., between the end 113 and the piston 120)

Furthermore, the ideal compensation volume due to expansion of the liquid may be determined based on the liquid containment volume V, the liquid thermal expansion coefficient γ, and the liquid compression coefficient β, such as by utilizing Equation (3) set forth below.

$$v_{idealexp} = V\gamma\left[\frac{\beta}{1-\beta} + 1\right] \quad (3)$$

where $v_{idealexp}$ is the ideal expansion compensation volume sufficient to compensate for the worst-case expansion of the liquid. However, parameters and/or equations other than as expressed in Equation (3) may also be utilized to determine $v_{idealexp}$ within the scope of the present disclosure.

Applying Equation (3) to the example container 105 described above having the liquid containment volume of 100 CC, the coefficient of expansion of 0.15, and the coefficient of compression of 0.10, the ideal expansion compensation volume is about 16.66 CC. Accordingly, the predetermined position of the piston 120 may be such that at least 16.66 CC of volume is maintained on the expansion side of the piston 120 (i.e., between the end 115 and the piston 120).

The ideal expansion compensation volume may also be adjusted to compensate for the lost stroke created by the volume of the residual gas 176 remaining within the first portion 122 of the chamber 110 if the volume of the residual gas 176 is greater than the ideal expansion compensation volume. Accordingly, for the example container 105 described above having the liquid containment volume of 100 CC, the ideal compression compensation volume of 11.11 CC, and filled with the liquid at 150 PSI, the volume of residual gas within the first portion 122 is determined to be about 11.11 CC. Since the ideal expansion compensation volume of 16.66 CC is greater than the volume of residual gas 176, the expansion compensation volume does not have to be increased to compensate for the residual gas 176. If the volume of the residual gas 176 was greater than the ideal expansion volume, than the expansion compensation volume on the expansion side of the piston 120 may have had to be increased by the difference between the volumes to compensate for the residual gas 176.

The position of the piston 120 may also be determined in terms of volumetric portion or percentage of the compensation volume to be allocated to the expansion side of the piston 120 and to the compression side of the piston 120 based simply on the liquid compression and thermal expansion coefficients. For example, the portion of the compensation volume to be allocated to the expansion side of the piston 120 may be determined utilizing Equation (4) set forth below, and the portion of the compensation volume to be allocated to the compression side of the piston 120 may be determined utilizing Equation (5) set forth below.

$$v_{exp} = \frac{\gamma}{\gamma + \beta} \quad (4)$$

$$v_{comp} = \frac{\beta}{\gamma + \beta} \quad (5)$$

where $v_{exp}$ is the portion of the compensation volume to be allocated on the expansion side of the piston 120, and $v_{comp}$ is the portion of the compensation volume to be allocated to the compression side of the piston 120. However, parameters and/or equations other than as expressed in Equations (4) and (5) may also be utilized to determine $v_{exp}$ and $v_{comp}$ within the scope of the present disclosure.

Applying Equations (4) and (5) to the example container 105 described above having the coefficient of expansion of 0.15 and the coefficient of compression of 0.10, the portion of the compensation volume to be allocated on the expansion side of the piston 120 is determined to be 0.60 and the portion of the compensation volume to be allocated on the compression side of the piston 120 is determined to be 0.40. Accordingly, the piston 120 may be positioned such that 60% of the compensation volume or compensation stroke is allocated to the expansion side of the piston 120 and 40% of the compensation volume or compensation stroke is allocated to the compression side of the piston 120. However, it is to be understood that the total compensation volume of the cavity 114 (i.e., the combined volume on both sides of the piston 120) should still be equal to or greater than the determined idea compensation volume and that the compensation volume on the expansion side of the piston 120 is greater than or equal to the volume of residual gas 176 within the first portion 122 to permit full compensation, as described above.

The predetermined positon 121 of the piston 120 and the compensation volume may be optimized and/or determined differently if the field operating conditions are known. For example, if the pressure and temperature conditions will be biased in compression, such as under high pressure and low temperature conditions, then the expansion of the liquid may be discounted and the piston 120 may be positioned against the end 115 of the cavity 114 during the pressurizing operations and, thus, may not have to be locked in position. Under such field operating conditions, just the ideal compression compensation volume may be determined by utilizing Equation (2) and incorporated into the cavity 114. However, if the pressure and temperature conditions will be biased in expansion, such as under low pressure and high temperature conditions, then the compression of the liquid may be discounted and the piston 120 may be maintained in positioned against the end 113 of the cavity 114 during the pressurizing operations. Under such operating conditions, just the ideal expansion compensation volume may be determined by utilizing Equation (3) and incorporated into the cavity 114. However, if both compression and expansion are a concern, such as under high pressure and temperature conditions, then the piston 120 may be maintained at the predetermined position 121 during the pressurizing operations, as described above, such that the combined volume of residual gas 176 and the liquid at full expansion conditions does not cause the piston 120 to reach full stroke (i.e., contact the end 115 of the cavity 114) and start to build pressure inside the container 105 that is, for example, too high for the container to withstand or leads to detrimental operation of other parts of the container 105 or apparatus comprising the container 105.

The problems associated with the detrimental effects of increased pressure within the first portion 122 of the container 105 may be overcome by installing a pressure relief valve within the container 105 to permit excess pressure to be relieved from the first portion 122 by bleeding the high pressure liquid once the piston 120 reaches full stroke. If the relief valve is used, it may be set to a relief pressure that is higher than the pressure achieved during the filling operations.

During the field operations, the liquid and the residual gas 176 remaining in the chamber 110 are compressed under an increasing pressure and expanded under an increasing temperature applied externally from the environment. The filling operations permit the filling of the chamber 110 with the liquid, without having to completely remove the residual gas 176 from the chamber 110. Thus, the filling operations facilitate reduction of unintended effects of the residual gas 176 remaining in the chamber 110 during the field operations, while avoiding to overdesign the container 105. The container 105 may thus be constructed thinner, lighter, and/or with a smaller overall volume.

Figure 7:
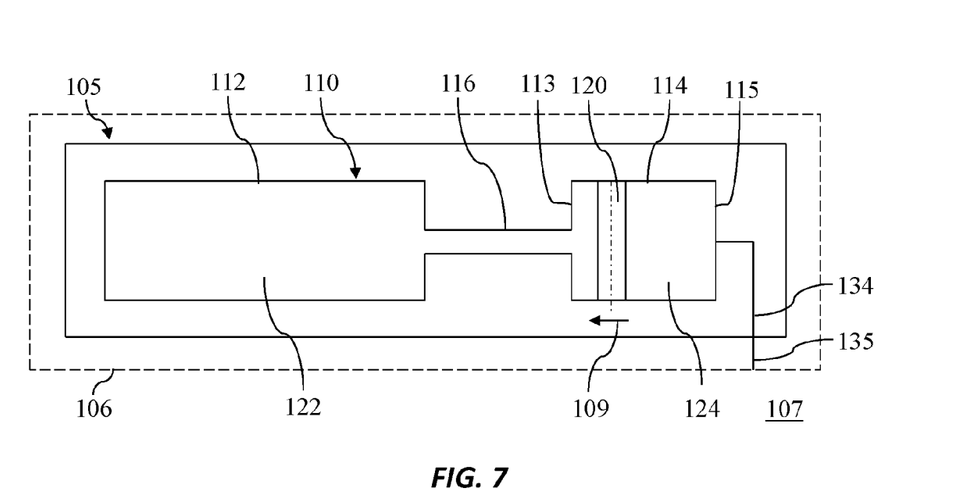
FIG. 7 is a schematic view of the apparatus shown in FIGS. 1-3 according to one or more aspects of the present disclosure.
Figure 8:
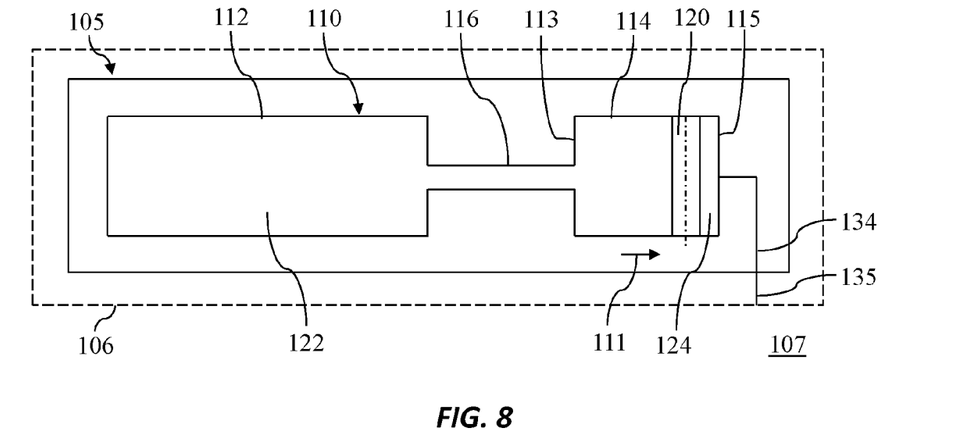
FIG. 8 is another view of the apparatus shown in FIG. 7 in a different stage of operation.

FIGS. 7 and 8 are schematic views of at least a portion of the container 105 shown in FIGS. 4-6 and at different stages of the field operations. The container 105 may be connected with or form at least a portion of a tool or apparatus 106 utilized or disposed within high pressure and/or high temperature external environment 107. As described below and shown in FIG. 9, the container 105 may be connected with or form at least a portion of a downhole tool string 210 conveyed within a wellbore 202 and, thus, exposed to high pressure and high temperature wellbore fluids. The chamber 110 may be fluidly connected with the external environment 107 via the port 134 and perhaps an outer port 135 of the apparatus 106. As the fluid valves 136, 138 are in the closed-flow position during the field operations, isolating the first portion 122 of the chamber 110 from the external environment 107, the fluid valves 136, 138 and the corresponding ports 130, 132 are not shown for clarity.

As the volume of the liquid within the first portion 122 of the chamber 110 decreases due to the increasing pressure of the external environment 107, such as when the container 105 is conveyed downhole within the wellbore 202, the piston 120 moves toward the end 113 of the cavity 114, as indicated by arrow 109, maintaining the pressure within the first portion 122 substantially equal to the external pressure. As the volume of the liquid within the first portion 122 increases due to the increasing temperature of the external environment 107, such as when the container 105 is conveyed downhole within the wellbore 202, the piston 120 moves toward the end 115 of the cavity 114, as indicated by arrow 111, maintaining the pressure within the first portion 122 substantially equal to the external pressure. As described above, the volumetric size of the cavity 114 and the positioning of the piston 120 within the cavity 114 may be determined such that the piston 120 does not contact the end 113 of the cavity 114 during the field operations due to the compression of the liquid and does not contact the end 115 of the cavity 114 due to expansion of the liquid, permitting full compensation under both compression and expansion conditions.

Figure 9:
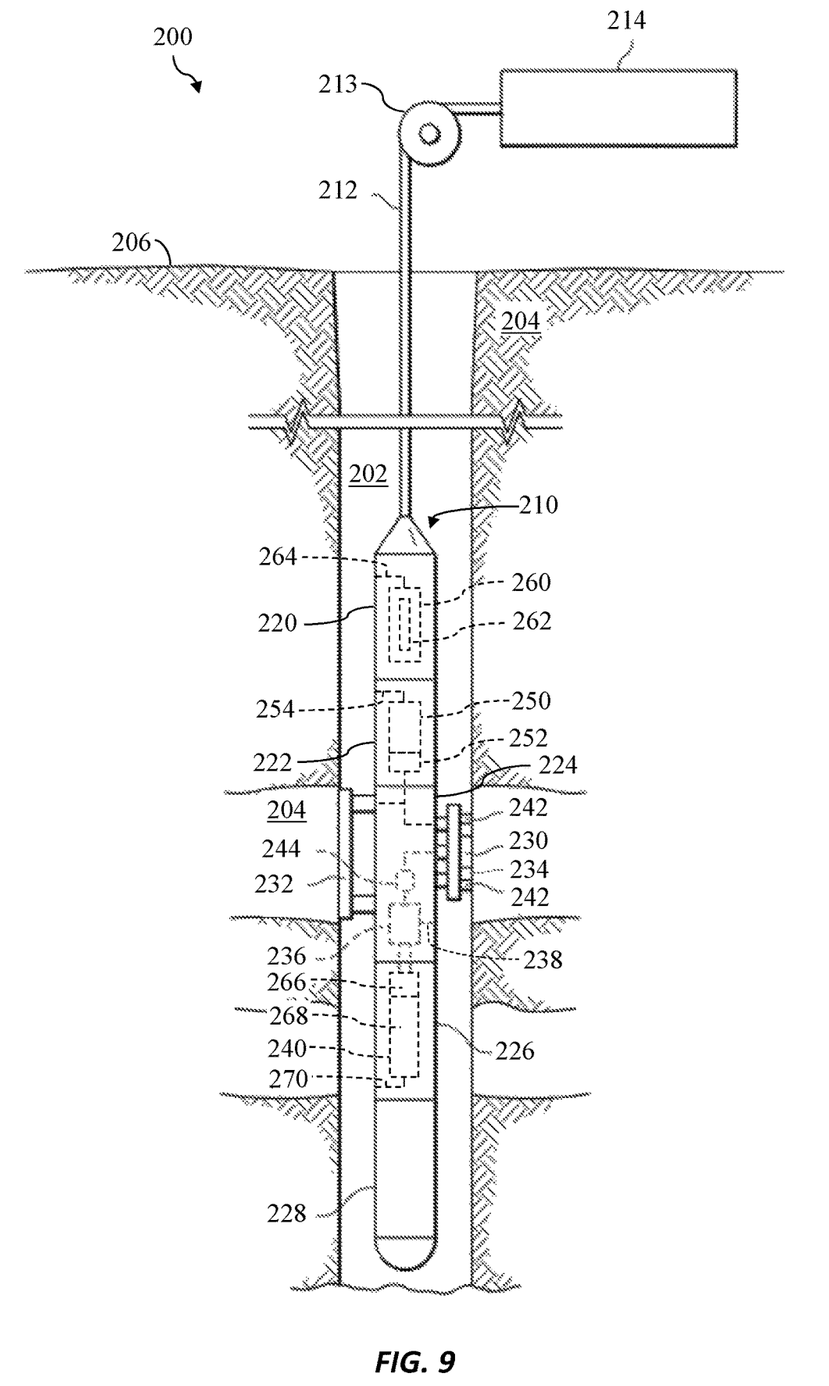
FIG. 9 is a schematic view of at least a portion of an example implementation of apparatus according to one or more aspects of the present disclosure.

FIG. 9 is a schematic view of at least a portion of an example implementation of a wellsite environment 200 to which one or more aspects of the present disclosure may be applicable. The wellsite system 200, which may be situated onshore or offshore, comprises a downhole tool 210 operable for engaging a portion of a sidewall of a wellbore 202 penetrating a subterranean formation 204. The downhole tool 210 may be suspended in the wellbore 202 from a lower end of a conveyance means 212, such as a cable, operably coupled with a tensioning device 213 disposed at the wellsite surface 206. The conveyance means 212 may also be communicatively coupled to surface equipment 214, such as may include a controller and/or other processing system for controlling the downhole tool 210. The surface equipment 214 may also have an interface for receiving commands from a surface operator. The surface equipment 214 may also store programs or instructions, including for implementing one or more aspects of the methods described herein.

The downhole tool 210 may comprise a telemetry module 220, a power module 222, a formation test module 224, and a sample module 226. The downhole tool 210 may also comprise additional components at various locations, such as a module 228 below the sample module 226, which may have varying functionality within the scope of the present disclosure.

The formation test module 224 may comprise a selectively extendable probe assembly 230 and a selectively extendable anchoring member 232 that are respectively arranged on opposing sides. The probe assembly 230 may be operable to selectively seal off or isolate selected portions of the sidewall of the wellbore 202. For example, the probe assembly 230 may comprise a sealing pad 234 that may be urged against the sidewall of the wellbore 202 in a sealing manner to prevent movement of formation fluid into or out of the formation 204 other than through the probe assembly 230. The probe assembly 230 may thus be operable to fluidly couple a pump 236 and/or other components of the formation test module 224 to the adjacent formation 204. Accordingly, the formation test module 224 may be utilized to obtain formation fluid samples from the formation 204 by extracting the formation fluid from the formation 204 using the pump 236. The formation fluid samples may thereafter be expelled through a port 238 into the wellbore 202 during a "clean up" operation until the formation fluid extracted from the formation 204 reaches a sufficiently low contamination level, at which time the extracted formation fluid may be directed to a detachable sample bottle or chamber 240 disposed in the sample module 226. The detachable sample chamber 240 may receive and retain the captured formation fluid for subsequent testing at the surface 206.

The sampling module 226 and/or the sample chamber 240 may be substantially similar to and/or otherwise have one or more aspects in common with the container 105 shown in FIGS. 4-8. For example, a portion 266 of the sample chamber 240 may be filled with the liquid, such as distilled water, at the wellsite surface 206 via the filling operations described above and maintained fluidly isolated from the wellbore 202 during downhole conveyance until the formation fluid is pumped into the portion 266 by the pump 236. Furthermore, another portion 268 of the sample chamber 240 may be fluidly connected with the wellbore 202 via a port 270, such as may permit the liquid and then the formation fluid within the portion 266 to be maintained at the wellbore pressure prior to and as the formation fluid is pumped into the portion 266 by the pump 236. Maintaining the liquid within the portion 266 at the wellbore pressure until the formation fluid is pumped into the portion 266 may prevent a sudden and/or violent inrush of the formation fluid into the portion 266 that may take place if the portion 266 was not pressure compensated and remained substantially at surface pressure.

The probe assembly 230 of the formation test module 224 may comprise one or more sensors 242 adjacent a port of the probe assembly 230, among other possible locations. The sensors 242 may be utilized in the determination of petrophysical parameters of a portion of the formation 204 proximate the probe assembly 230. For example, the sensors 242 may be utilized to measure or detect one or more of pressure, temperature, composition, electric resistivity, dielectric constant, magnetic resonance relaxation time, nuclear radiation, and/or combinations thereof, although other types of sensors are also within the scope of the present disclosure. The formation test module 224 may also comprise a fluid sensing unit 244 through which obtained fluid samples may flow, such as to measure properties and/or composition data of the sampled fluid. For example, the fluid sensing unit 244 may comprise one or more of a spectrometer, a fluorescence sensor, an optical fluid analyzer, a density and/or viscosity sensor, and/or a pressure and/or temperature sensor, among others.

The power module 222 may be or comprise a hydraulic power source, comprising a hydraulic fluid containment chamber 250 and a hydraulic fluid pump 252. The fluid pump 252 may be operable to selectively pump the hydraulic fluid from the chamber 250 to actuate the anchoring member 232 and the probe assembly 230. The power module 222 may be substantially similar to and/or otherwise have one or more aspects in common with the container 105 shown in FIGS. 4-8. For example, a portion of the chamber 250 may be filled with the hydraulic fluid at the wellsite surface 206 via the filling operations described above and maintained fluidly isolated from the wellbore 202 external to the power module 222 while another portion may be fluidly connected with the wellbore 202 via a port 254, such as may permit the hydraulic fluid within the chamber 250 to be maintained at the wellbore pressure as the pressure and temperature within the wellbore 202 changes during downhole operations. The fluid pump 252 may be disposed within or fluidly connected with the fluidly isolated portion of the chamber 250, such as to reduce or eliminate voids within the pump 252 or between the pump 252 and the chamber 250 to maintain the pump 252 at the wellbore pressure.

The telemetry module 220 may comprise a downhole control system 262 communicatively coupled to the surface equipment 214. The downhole control system 262 may include a controller/processing system comprising a circuit board and/or various electronic components for controlling operational aspects of the downhole tool 210, and may have an interface for receiving commands from the surface operator. The downhole control system 262 may also store programs or instructions, including for implementing one or more aspects of the methods described herein. For example, the surface equipment 214 and/or the downhole control system 262 may operate independently or cooperatively to control the probe assembly 230 and/or the extraction of fluid samples from the formation 204, such as via control of the pump 236. The surface equipment 214 and/or the downhole control system 262 may also analyze and/or process data obtained from sensors disposed in the fluid sensing unit 244 and/or the sensors 242, store measurements and/or processed data, and/or communicate the measurements and/or processed data to the surface and/or another component for subsequent analysis.

The telemetry module 220 may be substantially similar to and/or otherwise have one or more aspects in common with the container 105 shown in FIGS. 4-8. For example, the telemetry module 220 may comprise a chamber 260 having a portion thereof fluidly isolated from the wellbore 202 and another portion fluidly connected with the wellbore 202 via a port 264, such as may permit a fluid located within the chamber 260 to be maintained at the wellbore pressure as the pressure and temperature within the wellbore 202 changes during downhole operations. The portion of the chamber 260 isolated from the wellbore 202 may contain the control system 262 and may be filled with the fluid at the wellsite surface 206 via the filling operations described above. The chamber 260 may be filled with distilled water, gel, oil, and/or other filler liquid that surrounds the control system 262 and otherwise reduces or eliminates voids within the chamber 260, such as may permit the control system 262 to be maintained at the wellbore pressure.

Although FIG. 9 shows the wellsite system 200 comprising a tool string 210 conveyed into the wellbore 202 via a cable, it is to be understood that aspects of the present disclosure may be applicable to downhole tools conveyed into the wellbore 202 via other conveyance means 212, such as a wireline, a slickline, e-line, coiled tubing, drill pipe, production tubing, and/or other conveyance means.

In view of the entirety of the present disclosure, including the claims and the figures, a person having ordinary skill in the art will readily recognize that the present disclosure introduces an apparatus comprising a pressure compensated fluid containment system comprising: a chamber comprising a port; and a piston slidably disposed within the chamber and dividing the chamber into first and second portions, wherein the first portion is fluidly connected with the port and the second portion is in fluid communication with a space external to the apparatus, and wherein during liquid filling operations the apparatus is operable to: maintain the piston in a first piston position within the chamber while the first portion receives a liquid via the port to compress gas located within the first portion; and permit the piston to move to a second piston position due to expansion of the gas compressed within the first portion.

The liquid may substantially (e.g., at least about 99%) comprise either water or oil.

The gas may substantially (e.g., at least about 99%) comprise air.

The chamber may comprise a plurality of fluidly connected cavities.

The port may be a first port, the chamber may further comprise a second port, the second portion may be in fluid communication with the second port, and the second port may be in fluid communication with the space external to the apparatus.

The port may be a first port, the chamber may further comprise a second port fluidly connected with the first portion, and during the liquid filling operations the apparatus may be further operable introduce the liquid into the first portion via the first port and discharge the liquid from the first portion via the second port to flush out the gas located within the first portion.

The first piston position within the chamber may be selectable. The first piston position may be selected based at least partially on a coefficient of compression of the liquid and a coefficient of thermal expansion of the liquid.

The apparatus may comprise a filling system comprising: (A) a liquid pump operable to: (1) pump the liquid into the first portion via the port; and (2) stop pumping the liquid when a predetermined pressure within the first portion is reached or when a predetermined volume of the liquid is introduced into the first portion; and (B) a latch operable to: (1) extend to engage the piston to maintain the piston in the first piston position within the chamber while the liquid is pumped into the first portion; and (2) retract to disengage from the piston when the liquid pump stops pumping the liquid to permit the piston to move to the second piston position due to expansion of the gas compressed within the first portion.

The apparatus may comprise a filling system comprising: (A) a liquid pump operable to: (1) pump the liquid into the first portion via the port; and (2) stop pumping the liquid when a predetermined pressure within the first portion is reached or when a predetermined volume of the liquid is introduced into the first portion; and (B) a fluid pump operable to: (1) pump a fluid into the second portion to maintain the piston in the first piston position within the chamber while the liquid is pumped into the first portion; and (2) stop pumping the fluid when the liquid pump stops pumping the liquid to permit the piston to move to the second piston position due to expansion of the gas compressed within the first portion. In such implementations, among others within the scope of the present disclosure, the fluid pump may be or comprise the liquid pump, and the fluid may be the liquid.

The apparatus may be operable to increase pressure of the liquid within the first portion to a predetermined pressure to compress the gas within the first portion. The predetermined pressure may range between about 100 PSI and about 1,500 PSI.

A downhole tool may comprise the pressure compensated fluid containment system, the second portion may be in fluid communication with a space external to the downhole tool, and during conveyance of the downhole tool within a wellbore as the ambient wellbore pressure increases, the piston may move in a direction away from the second piston position as the liquid and the gas within the first portion is compressed to maintain pressure within the first portion substantially equal to the increasing ambient wellbore pressure. In such implementations, among others within the scope of the present disclosure, the direction may be a first direction, and during conveyance of the downhole tool within the wellbore as the ambient wellbore temperature increases, the piston may move in a second direction opposite the first direction as the liquid within the first portion expands to maintain the pressure within the first portion substantially equal to the ambient wellbore pressure.

The chamber may contain mechanical and/or electrical components.

The apparatus may comprise a sensor operable to generate information indicative of pressure of the liquid within the first portion.

The apparatus may comprise a sensor operable to generate information indicative of volume of the liquid received by the first portion.

The present disclosure also introduces a method comprising: restraining movement of a piston slidably disposed within a pressure compensated fluid container in a first piston position, wherein the piston divides the fluid container into first and second portions; pumping a liquid into the first portion to compress gas located within the first portion; stopping the pumping of the liquid into the first portion; and stopping the restraining of movement of the piston to permit the piston to move to a second piston position due to expansion of the gas compressed within the first portion.

The method may be or comprise a method for filling the pressure compensated fluid container with the liquid.

The fluid container may comprise a plurality of fluidly connected cavities, and the piston may be slidably disposed within one of the plurality of cavities.

The liquid may substantially comprise either water or oil.

The gas may substantially comprise air.

The fluid container may comprise first and second ports fluidly connected with the first portion, and the method may comprise: pumping the liquid into the first portion via the first port; and discharging the liquid from the first portion via the second port to circulate the liquid through the first portion to flush out the gas from the first portion.

The method may comprise, before pumping the liquid into the first portion, applying vacuum to the first portion to remove the gas from the first portion.

The method may comprise, before restraining the movement of the piston, moving the piston to the first piston position at which the piston is to be restrained. In such implementations, among others within the scope of the present disclosure, the method may further comprise determining the location of the first piston position based at least partially on a coefficient of compression of the liquid and a coefficient of thermal expansion of the liquid.

Restraining movement of the piston may comprise engaging a latch with the piston to maintain the piston in the first piston position within the fluid container while the liquid is pumped into the first portion. In such implementations, among others within the scope of the present disclosure, stopping the restraining of movement of the piston may comprise disengaging the latch from the piston after stopping the pumping of the liquid into the first portion.

Restraining movement of the piston may comprise pressurizing the second portion to substantially equalize forces imparted on opposing sides of the piston to maintain the piston in the first piston position within the fluid container while the liquid is pumped into the first portion. In such implementations, among others within the scope of the present disclosure, stopping the restraining of movement of the piston may comprise depressurizing the second portion after stopping pumping of the liquid into the first portion.

Stopping the pumping of the liquid into the first portion may be performed after a predetermined pressure within the first portion is reached or after a predetermined volume of the liquid is introduced into the first portion.

Pumping the liquid into the first portion may increase pressure within the first portion to a predetermined pressure to compress the gas within the first portion. The predetermined pressure may range between about 100 PSI and about 1,500 PSI.

A downhole tool may comprise the piston and the pressure compensated fluid container, the second portion may be in fluid communication with a space external to the downhole tool, and the method may comprise conveying the downhole tool within a wellbore causing an increasing ambient pressure to move the piston in a direction away from the second piston position as the liquid and gas within the first portion is compressed to maintain pressure within the first portion substantially equal to the increasing ambient pressure. In such implementations, among others within the scope of the present disclosure, the direction may be a first direction, and conveying the downhole tool within the wellbore may cause an increasing ambient temperature to move the piston in a second direction opposite the first direction as the liquid within the first portion expands to maintain the pressure within the first portion substantially equal to the ambient pressure.

The chamber may contain mechanical and/or electrical components.

The method may comprise monitoring pressure within the first portion while pumping the liquid into the first portion.

The method may comprise monitoring volume of the liquid pumped into the first portion.

The present disclosure also introduces a method comprising: (A) filling a pressure compensated fluid chamber of a downhole tool by: (1) restraining movement of a piston slidably disposed within the chamber in a first piston position, wherein the piston divides the chamber into first and second portions, and wherein the second portion is in fluid communication with a space external to the downhole tool;

(2) pumping a liquid into the first portion to compress gas located within the first portion; (3) stopping the pumping of the liquid into the first portion; and (4) stopping the restraining of movement of the piston to permit the piston to move to a second piston position due to expansion of the gas compressed within the first portion; and (B) conveying the downhole tool within a wellbore causing an increasing ambient pressure to move the piston away from the second piston position as the liquid and gas within the first portion is compressed to maintain pressure within the first portion substantially equal to the increasing ambient pressure.

The fluid chamber may comprise a plurality of fluidly connected cavities, and the piston may be slidably disposed within one of the plurality of cavities.

The liquid may substantially comprise either water or oil.

The gas may substantially comprise air.

The fluid chamber may comprise first and second ports fluidly connected with the first portion, and the method may comprise: pumping the liquid into the first portion via the first port; and discharging the liquid from the first portion via the second port to circulate the liquid through the first portion to flush out the gas from the first portion.

The method may comprise, before pumping the liquid into the first portion, applying vacuum to the first portion to remove the gas from the first portion.

The method may comprise, before restraining the movement of the piston, moving the piston to the first piston position at which the piston is to be restrained. In such implementations, among others within the scope of the present disclosure, the method may comprise determining the location of the first piston position based at least partially on a coefficient of compression of the liquid and a coefficient of thermal expansion of the liquid.

Restraining movement of the piston may comprise engaging a latch with the piston to maintain the piston in the first piston position within the fluid container while the liquid is pumped into the first portion. In such implementations, among others within the scope of the present disclosure, stopping the restraining of movement of the piston may comprise disengaging the latch from the piston after stopping the pumping of the liquid into the first portion.

Restraining movement of the piston may comprise pressurizing the second portion to substantially equalize forces imparted on opposing sides of the piston to maintain the piston in the first piston position within the fluid container while the liquid is pumped into the first portion. In such implementations, among others within the scope of the present disclosure, stopping the restraining of movement of the piston may comprise depressurizing the second portion after stopping pumping of the liquid into the first portion.

Stopping the pumping of the liquid into the first portion may be performed after a predetermined pressure within the first portion is reached or after a predetermined volume of the liquid is introduced into the first portion.

Pumping the liquid into the first portion may increase pressure within the first portion to a predetermined pressure to compress the gas within the first portion. The predetermined pressure may range between about 100 PSI and about 1,500 PSI.

Conveying the downhole tool within the wellbore may cause an increasing ambient temperature to further move the piston as the liquid within the first portion expands to maintain the pressure within the first portion substantially equal to the ambient pressure.

The chamber may contain mechanical and/or electrical components.

The method may comprise monitoring pressure within the first portion while pumping the liquid into the first portion.

The method may comprise monitoring volume of the liquid pumped into the first portion.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to comply with 37 C.F.R. §1.72(b) to permit the reader to quickly ascertain the nature of the technical disclosure. It is submitted with the understanding that it will not be used to interpret or limit the scope or meaning of the claims.

What is claimed is:

1. An apparatus comprising:
    a pressure compensated fluid containment system comprising:
        a chamber comprising a port; and
        a piston slidably disposed within the chamber and dividing the chamber into first and second portions, wherein the first portion is fluidly connected with the port and the second portion is in fluid communication with a space external to the apparatus, and wherein during liquid filling operations the apparatus is operable to:
            maintain the piston in a first piston position within the chamber while the first portion receives a liquid via the port to compress gas located within the first portion; and
            permit the piston to move to a second piston position due to expansion of the gas compressed within the first portion.

2. The apparatus of claim 1 wherein the port is a first port, wherein the chamber further comprises a second port fluidly connected with the first portion, and wherein during the liquid filling operations the apparatus is further operable to introduce the liquid into the first portion via the first port and discharge the liquid from the first portion via the second port to flush out the gas located within the first portion.

3. The apparatus of claim 1 wherein the first piston position within the chamber is selectable based at least partially on a coefficient of compression of the liquid and a coefficient of thermal expansion of the liquid.

4. The apparatus of claim 1 further comprising a filling system comprising:
    a liquid pump operable to:
        pump the liquid into the first portion via the port; and
        stop pumping the liquid when a predetermined pressure within the first portion is reached or when a predetermined volume of the liquid is introduced into the first portion; and
    a latch operable to:
        extend to engage the piston to maintain the piston in the first piston position within the chamber while the liquid is pumped into the first portion; and
        retract to disengage from the piston when the liquid pump stops pumping the liquid to permit the piston to move to the second piston position due to expansion of the gas compressed within the first portion.

5. The apparatus of claim 1 further comprising a filling system comprising:
a liquid pump operable to:
pump the liquid into the first portion via the port; and
stop pumping the liquid when a predetermined pressure within the first portion is reached or when a predetermined volume of the liquid is introduced into the first portion; and
a fluid pump operable to:
pump a fluid into the second portion to maintain the piston in the first piston position within the chamber while the liquid is pumped into the first portion; and
stop pumping the fluid when the liquid pump stops pumping the liquid to permit the piston to move to the second piston position due to expansion of the gas compressed within the first portion.

6. A method comprising:
restraining movement of a piston slidably disposed within a pressure compensated fluid container in a first piston position, wherein the piston divides the fluid container into first and second portions;
pumping a liquid into the first portion to compress gas located within the first portion;
stopping the pumping of the liquid into the first portion; and
stopping the restraining of movement of the piston to permit the piston to move to a second piston position due to expansion of the gas compressed within the first portion.

7. The method of claim 6 wherein the fluid container comprises a plurality of fluidly connected cavities, and wherein the piston is slidably disposed within one of the cavities.

8. The method of claim 6 wherein the liquid substantially comprises either water or oil, and wherein the gas substantially comprises air.

9. The method of claim 6 wherein the fluid container comprises first and second ports fluidly connected with the first portion, and wherein the method further comprises:
pumping the liquid into the first portion via the first port; and
discharging the liquid from the first portion via the second port to circulate the liquid through the first portion to flush out the gas from the first portion.

10. The method of claim 6 further comprising, before pumping the liquid into the first portion, applying vacuum to the first portion to remove the gas from the first portion.

11. The method of claim 6 further comprising, before restraining the movement of the piston, moving the piston to the first piston position at which the piston is to be restrained.

12. The method of claim 11 further comprising selecting the location of the first piston position based at least partially on a coefficient of compression of the liquid and a coefficient of thermal expansion of the liquid.

13. The method of claim 6 wherein:
restraining movement of the piston comprises engaging a latch with the piston to maintain the piston in the first piston position within the fluid container while the liquid is pumped into the first portion; and
stopping the restraining of movement of the piston comprises disengaging the latch from the piston after stopping the pumping of the liquid into the first portion.

14. The method of claim 6 wherein:
restraining movement of the piston comprises pressurizing the second portion to substantially equalize forces imparted on opposing sides of the piston to maintain the piston in the first piston position within the fluid container while the liquid is pumped into the first portion; and
stopping the restraining of movement of the piston comprises depressurizing the second portion after stopping pumping of the liquid into the first portion.

15. The method of claim 6 wherein stopping the pumping of the liquid into the first portion is performed after a predetermined pressure within the first portion is reached or after a predetermined volume of the liquid is introduced into the first portion.

16. The method of claim 6 wherein pumping the liquid into the first portion increases pressure within the first portion to a predetermined pressure to compress the gas within the first portion.

17. The method of claim 6 wherein a downhole tool comprises the piston and the pressure compensated fluid container, wherein the second portion is in fluid communication with a space external to the downhole tool, and wherein the method further comprises conveying the downhole tool within a wellbore causing an increasing ambient pressure to move the piston in a direction away from the second piston position as the liquid and gas within the first portion is compressed to maintain pressure within the first portion substantially equal to the increasing ambient pressure.

18. The method of claim 17 wherein the direction is a first direction, and wherein conveying the downhole tool within the wellbore further causes an increasing ambient temperature to move the piston in a second direction opposite the first direction as the liquid within the first portion expands to maintain the pressure within the first portion substantially equal to the ambient pressure.

19. A method comprising:
filling a pressure compensated fluid chamber of a downhole tool by:
restraining movement of a piston slidably disposed within the chamber in a first piston position, wherein the piston divides the chamber into first and second portions, and wherein the second portion is in fluid communication with a space external to the downhole tool;
pumping a liquid into the first portion to compress gas located within the first portion;
stopping the pumping of the liquid into the first portion; and
stopping the restraining of movement of the piston to permit the piston to move to a second piston position due to expansion of the gas compressed within the first portion; and
conveying the downhole tool within a wellbore causing an increasing ambient pressure to move the piston away from the second piston position as the liquid and gas within the first portion is compressed to maintain pressure within the first portion substantially equal to the increasing ambient pressure.

20. The method of claim 19 wherein conveying the downhole tool within the wellbore further causes an increasing ambient temperature to further move the piston as the liquid within the first portion expands to maintain the pressure within the first portion substantially equal to the ambient pressure.

* * * * *